(12) United States Patent
Barton et al.

(10) Patent No.: US 11,238,611 B2
(45) Date of Patent: Feb. 1, 2022

(54) SYSTEM AND METHOD FOR EYEWEAR SIZING

(71) Applicant: Electric Avenue Software, Inc., Venice, CA (US)

(72) Inventors: David Barton, Manhattan Beach, CA (US); Ethan D. Joffe, Venice, CA (US)

(73) Assignee: Electric Avenue Software, Inc., Venice, CA (US)

(*) Notice: Subject to any disclaimer, the term of this patent is extended or adjusted under 35 U.S.C. 154(b) by 0 days.

(21) Appl. No.: 16/919,958

(22) Filed: Jul. 2, 2020

(65) Prior Publication Data

US 2021/0012525 A1  Jan. 14, 2021

Related U.S. Application Data

(60) Provisional application No. 62/872,042, filed on Jul. 9, 2019.

(51) Int. Cl.
 *G06T 7/73* (2017.01)
 *G06K 9/00* (2006.01)
 *G02C 13/00* (2006.01)

(52) U.S. Cl.
 CPC .............. *G06T 7/73* (2017.01); *G02C 13/005* (2013.01); *G06K 9/00228* (2013.01); *G06K 9/00281* (2013.01); *G06T 2207/30201* (2013.01)

(58) Field of Classification Search
 CPC ............ G06T 7/73; G06T 2207/30201; G06K 9/00228; G06K 9/00281; G06K 2009/6864; G02C 13/005
 See application file for complete search history.

(56) References Cited

U.S. PATENT DOCUMENTS

| | | | |
|---|---|---|---|
| 6,286,957 B1* | 9/2001 | Livnat | A61B 3/111 351/204 |
| 7,845,797 B2* | 12/2010 | Warden | G02C 5/126 351/204 |
| 9,507,175 B2* | 11/2016 | Cuta | G02C 13/003 |
| 9,589,340 B2* | 3/2017 | Guerin | G02C 13/003 |
| 10,216,010 B2* | 2/2019 | Tiemann | G02C 13/005 |
| 10,222,636 B2* | 3/2019 | Barton | G02C 13/005 |
| 10,859,859 B2* | 12/2020 | Nieuwenhuis | G02C 13/003 |
| 2003/0123026 A1* | 7/2003 | Abitbol | G06Q 30/0641 351/204 |
| 2011/0299033 A1* | 12/2011 | Wada | G02C 13/005 351/204 |
| 2016/0299360 A1* | 10/2016 | Fonte | G06T 17/00 |
| 2016/0327815 A1* | 11/2016 | Rego | G02C 13/005 |
| 2019/0271858 A1* | 9/2019 | Nieuwenhuis | G06T 7/12 |
| 2020/0233239 A1* | 7/2020 | Schwarz | G06F 30/17 |

* cited by examiner

*Primary Examiner* — Wesley J Tucker
(74) *Attorney, Agent, or Firm* — Pillsbury Winthrop Shaw Pittman, LLP

(57) ABSTRACT

Provided is a process for generating specifications for lenses of eyewear based on locations of extents of the eyewear determined through a pupil location determination process. Some embodiments capture an image and determine, using computer vision image recognition functionality, the pupil locations of a human's eyes based on the captured image depicting the human wearing eyewear.

20 Claims, 17 Drawing Sheets

1100

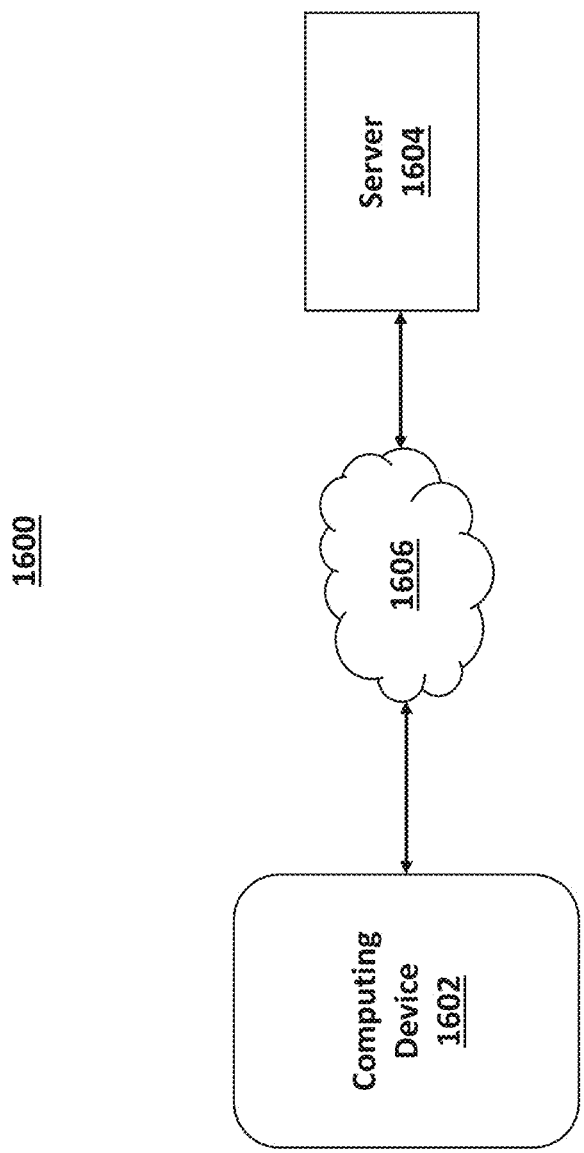

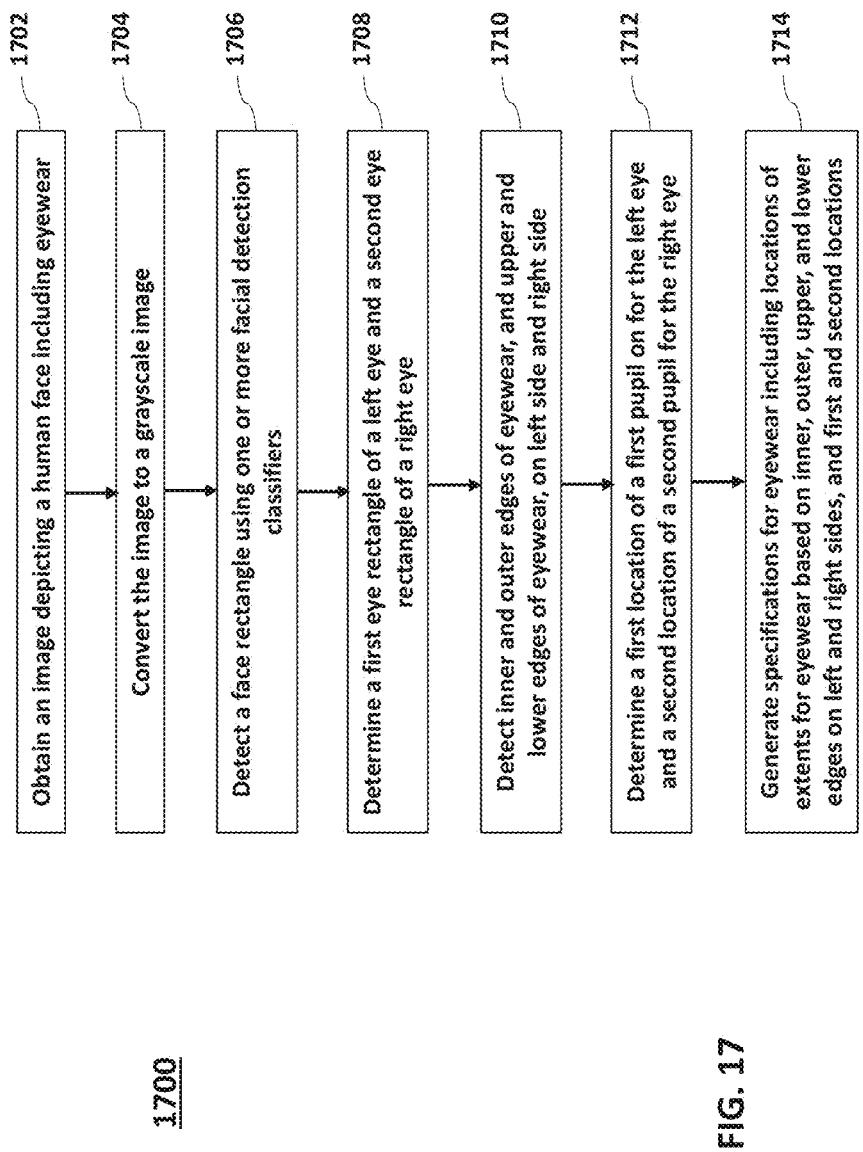

US 11,238,611 B2

SYSTEM AND METHOD FOR EYEWEAR SIZING

CROSS-REFERENCE TO RELATED APPLICATIONS

The present disclosure claims the benefit of U.S. Provisional Patent Application 62/872,042, titled "SYSTEM AND METHOD FOR EYEWEAR SIZING," filed on Jul. 9, 2019. The entire content of the afore-listed filed application is hereby incorporated by reference in its entirety.

BACKGROUND

1. Field

The present disclosure relates generally to computer vision and, more specifically, a process for computing a location of a pupil of an individual for generating eyewear for an individual.

2. Description of the Related Art

The proliferation of online shopping (e.g., Internet-based electronic retail) has made it more convenient to view and purchase items from the comfort of one's home, office, or any location where a connection to the Internet can be made. Traditionally, purchasing of some items, such as eyewear, required individuals to visit brick-and-mortar stores. However, more recently, the ability to purchase items like eyewear online has increased. Eyewear purchases, such as glasses, frames for glasses, and the like, are personal decisions, and the selection of one's eyewear amongst the various styles and selections of frames can oftentimes be difficult for users to visualize without physically trying on the eyewear. In a similar manner, identifying the correct lenses to fit into the desired eyewear is challenging without the user visiting an optician or other eyecare professional.

SUMMARY

The following is a non-exhaustive listing of some aspects of the present techniques. These and other aspects are described in the following disclosure.

Some aspects include a method comprising: obtaining, with the computing system, an image depicting a human face including eyewear; converting the image to a grayscale image; detecting a face rectangle using one or more facial detection classifiers; determining, based on the face rectangle, using one or more facial detection classifiers, a first eye rectangle of a left eye of the human face and a second eye rectangle of a right eye of the human face; detecting, based on the first eye rectangle and the second eye rectangle, an inner edge and an outer edge of the eyewear on a left side of the human face and on a right side of the human face, and an upper edge and a lower edge of the eyewear on the left side of the human face and on the right side of the human face; determining a first location of a first pupil of the left eye and a second location of a second pupil of the right eye based on the inner edge and the outer edge of the eyewear on the left side and on the right side, and the upper edge and the lower edge of the eyewear on the left side and the right side; generating specifications including locations of extents for the eyewear based on (i) the inner edge and the outer edge of the eyewear on the left side and on the right side, (ii) the upper edge and the lower edge of the eyewear on the left side and the right side, and (iii) the first location of the first pupil and the second location of the second pupil.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 16 is an illustrative diagram of an example computing environment, in accordance with various embodiments; and FIG. 17 is an illustrative flowchart of a process for generating specifications for eyewear based on a captured image, in accordance with various embodiments.

Figure 1:
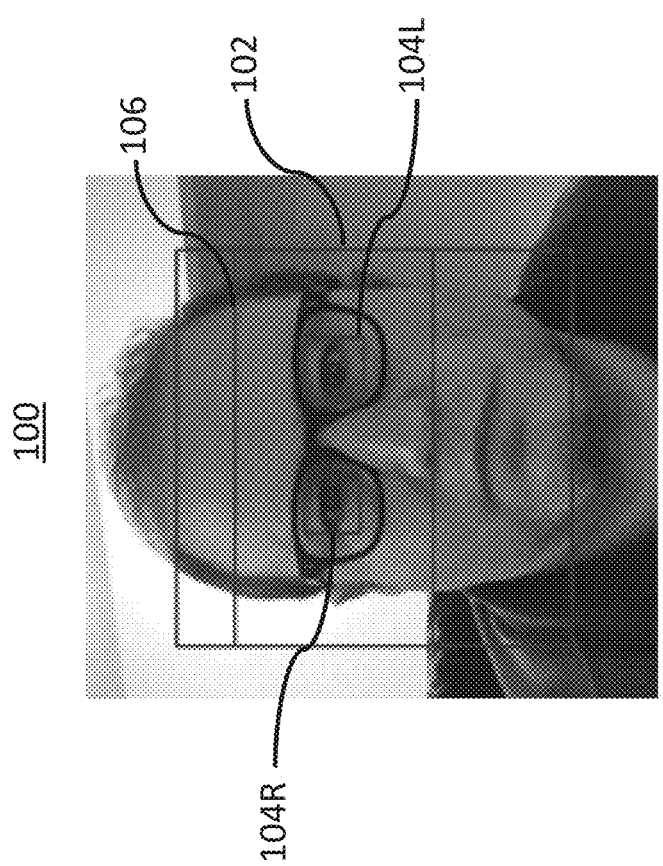
FIG. 1 is an illustrative diagram of the results of skewing, grayscaling, finding a face rectangle, and finding left and right eye rectangles within an image of an individual, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer vision. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, a process for computing a location of a pupil of an individual for generating eyewear for an individual is described herein. In some embodiments, the process may begin by manually deskewing a roll of an image to make sure glasses are level. As described herein, the terms "glasses," "eyeglasses," and "eyewear" may be used interchangeably. Some examples of eyewear include, but are not limited to, corrective glasses, safety glasses, sunglasses, 3D glasses, magnifying glasses, computer/gaming glasses, anti-glare glasses, goggles, or others. Furthermore, as described herein, glasses include lenses and frames, and particular reference to the lenses or the frames is made when needed. Many different materials may be used to form the frames, including metals, plastics, and the like, and the shapes and the colors of the frames may vary.

In some embodiments, the manual deskewing may be performed as a separate step in a graphical user interface (GUI) displayed on a user device (e.g., a mobile device). For example, a user may access an image capture feature of their mobile device via a GUI, and may capture an image via the image capture feature. The image may be sent via an application instance executing on the user's mobile device to a remote computer vision system for computing pupil location and crafting eyewear for the user. The image may include a portion of the user's face including glasses or including a region where glasses would be worn by the user. Alternatively, some or all of the image processing capabilities of the remote computer vision system may be performed by the application instance. Some examples of such neural networks that a client-side computer vision system may be implemented on include, but are not limited to MobileNet V1, MobileNet V2, MobileNet V3, ResNet, NASNet, EfficientNet, and others. As described herein, the computer vision system refers to a remote computer vision system, a client-side computer vision system, or a hybrid combination of a remote computer vision system and a client-side computer vision system, and description of processes performed by a computer vision system may be processes performed by the remote computer vision system, the client-side computer vision system, or the hybrid combination of the remote computer vision system and the client-side computer vision system unless explicitly stated.

Upon receipt of the image, algorithm configuration parameters may be initiated by the computer vision system using default settings and any extra specified in API call.

In some embodiments, after the algorithm configuration parameter have been initiated, the computer vision system may convert the image to grayscale.

In some embodiments, the computer vision system may be configured to detect a face rectangle using one or more facial detection classifiers, e.g., Haar cascade classifiers. The classifiers may then be iterated until one successfully finds a face within the image. If, however, no face is found by the classifiers, the full image may be used as the face. In some embodiments, the vertical area of the resulting face may be reduced. For example, the vertical area of the face may be reduced by approximately 50%, which has been determined to be reasonable through practical experience with human face detection techniques. By reducing the vertical area of the image, the speed and accuracy of identifying certain facial features, e.g., pupils, may be increased.

In some embodiments, eye rectangles may be detected using one or more facial detection classifiers, e.g., Haar cascade classifiers. The classifiers may then be iterated until one successfully finds a left eye and a right eye within the image. For example, the classifiers may be iterated until a left eye and a right eye are found in the area of the image determined to include a face. In some embodiments, upon detection of the left and right eyes, heuristics may be applied to filter out eye rectangle combinations that do not "make sense." For example, results are discarded if the eye rectangles for the left eye and the right eye: are too low on the face, are too large relative to the face, are too close together horizontally, or do not have enough overlap vertically, or any combination thereof.

In some embodiments, after the left and right eye rectangles have been found, the horizontal and vertical extents of glasses may be found. The horizontal and vertical extents of the glasses may correspond to an edge of the inner or outer portion of the glasses frame on the right/left side of the face and the upper or lower portion of the glasses frame on the top/bottom side of the face.

In some embodiments, pupils within the left and right eyes may be found.

In some embodiments, locations of the glasses extents, e.g., inner/outer and upper/lower, and locations of the pupils may be used to compute the specifications for the glasses so that lenses for the glasses may be manufactured. For example, the specifications may include pupillary and SEG distances.

FIG. 1 is an illustrative diagram of the results of skewing, grayscaling, finding a face rectangle, and finding left and right eye rectangles within an image of an individual, in accordance with various embodiments. In some embodiments, image 100 may include a face rectangle 102 and eye rectangles 104L and 104R may be computed using one or more classifiers. For example, a Haar cascade classifier may be used to find face rectangle 102 and eye rectangles 104L and 104R within image 100 received by a computer vision system from a user device. In some embodiments, image 100 further may illustrate a vertical reduction of the image. For example, a 50% reduction in a vertical direction may be used to reduce an amount of image area. As seen in FIG. 1, the 50% reduction may correspond to an inner rectangle 106 surrounding the glasses, and further including left and right eye rectangles 104L and 104R, respectively.

Figure 2:
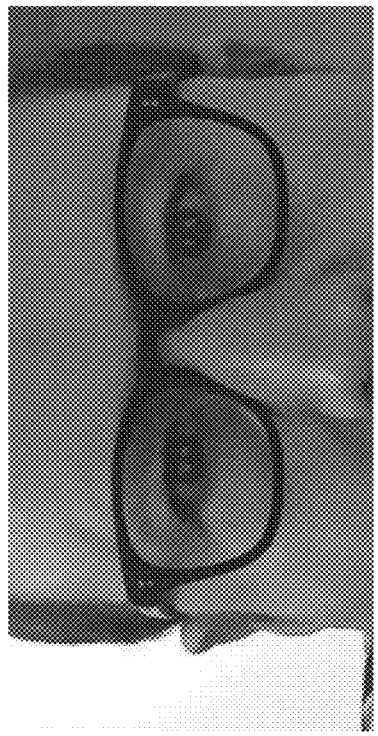
FIG. 2 is an illustrative diagram of a reduced image area as described with respect to FIG. 1, in accordance with various embodiments.

FIG. 2 is an illustrative diagram of the reduced image area as described above with respect to FIG. 1, in accordance with various embodiments. In FIG. 2, the left and right eye rectangles from FIG. 1 are not displayed.

In some embodiments, a process for determining glasses extents—horizontal extent, vertical extents, or both—may be described.

Figure 3:
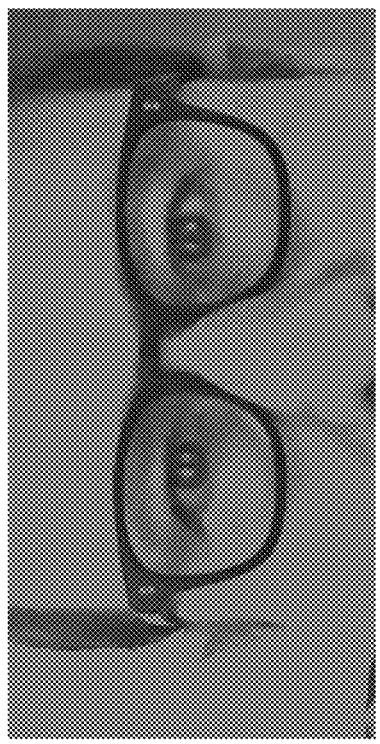
FIG. 3 is an illustrative diagram of an HSV representation of the reduced subsection image as described with respect to FIG. 2, in accordance with various embodiments.

Reduced subsection image 200 of FIG. 2 may correspond to an image area associated with inner rectangle 106 from FIG. 1. Using the image area associated with reduced subsection image 200 of the image of the user's face, as seen in FIG. 2, the computer vision system may convert the image to an HSV representation, e.g., hue, saturation, value. In some embodiments, the value "V" portion of the HSV representation may be clipped and this version of the image may be converted back to grayscale. For example, FIG. 3 describes an HSV representation 300 of reduced subsection image 200 from FIG. 2. In some embodiments, HSV representation 300 depicts reduced subsection image 200 having the V portion clipped. In some embodiments, an hsv_clip_ratio, which may correspond to an amount of clipping in value V of HSV representation 300, based on a mean V and a standard deviation V, may be 0.0. Alternatively, the hsv_clip_ratio may include a value from the range of 0.0-0.1, 0.0-0.2, 0.0-0.3, or other ranges.

Figure 4:
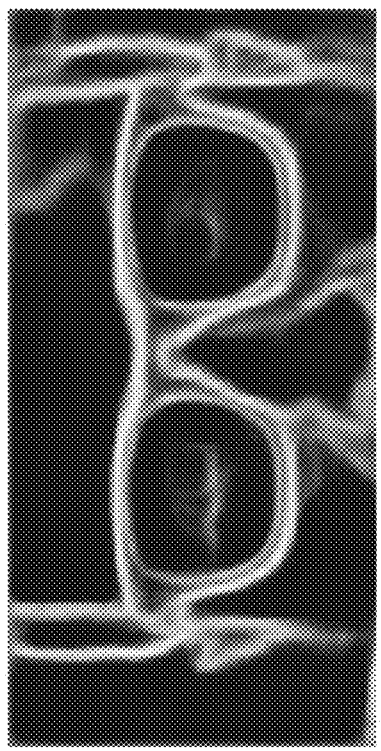
FIG. 4 is an illustrative diagram of an edge detection representation output by a convolutional neural network (CNN) used by a computer vision system, in accordance with various embodiments.

In some embodiments, the computer vision system may include a convolutional neural network (CNN). The CNN may be utilized by the computer vision system to perform edge detection processing to the HSV representation, e.g., HSV representation 300, having the V portion clipped and converted back to grayscale. For example, as illustrated by FIG. 4, a CNN used by the computer vision system may output an edge detection representation 400.

In some embodiments, the computer vision system may include other machine learning systems in addition to, or instead of, a CNN. For example, the machine learning techniques that can be used in the systems described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

Some embodiments include computer vision systems using a neural network architecture that runs efficiently on mobile computing devices, e.g., smart phones, tablet computing devices, etc. Some examples of such neural networks include, but are not limited to MobileNet V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, for example, three convolutional layers are included: a 1×1 convolution layer, a 3×3 depthwise convolution layer, and another 1×1 convolution layer. The first 1×1 convolution layer may be referred to as the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block. In some embodiments, the neural network or networks may be implemented using server-side programming architecture, such as Python, Keras, and the like, or they may be implanted using client-side programming architecture, such as TensorFlow Lite or TensorRT.

In some embodiments, a custom built vertical edge finding algorithm may be used to generate a robust set of candidate edges. The set of candidate edges may represent candidate edges corresponding to inner edges of the glasses. For example, the inner edge may correspond to an inner edge of the glasses of FIG. 4 on both the right and left side of edge detection representation 400, where the lenses contact the frame. In some embodiments, the custom built vertical edge finding algorithm may iterate one or more dimensions of lower level algorithm parameter ranges. As an example, the iteration ranges may be the black/white thresholding of the output image of the CNN based edge detection image (e.g., edge detection representation 400 of FIG. 4), which may allow the algorithm to be robust when dealing with inconsistent lighting, reflections, and other issues associated with analyzing real world images from customers, e.g., individuals capturing an image and sending that image to the computer vision system. At each iteration, the edge finding algorithm may search for vertical pixel range transitions denoting edges, adjust the edge positions to compensate for displacement caused by thresholding, and collect all adjusted edge positions found as being the candidate set of glasses extent edges.

Figures 5A, 5B:
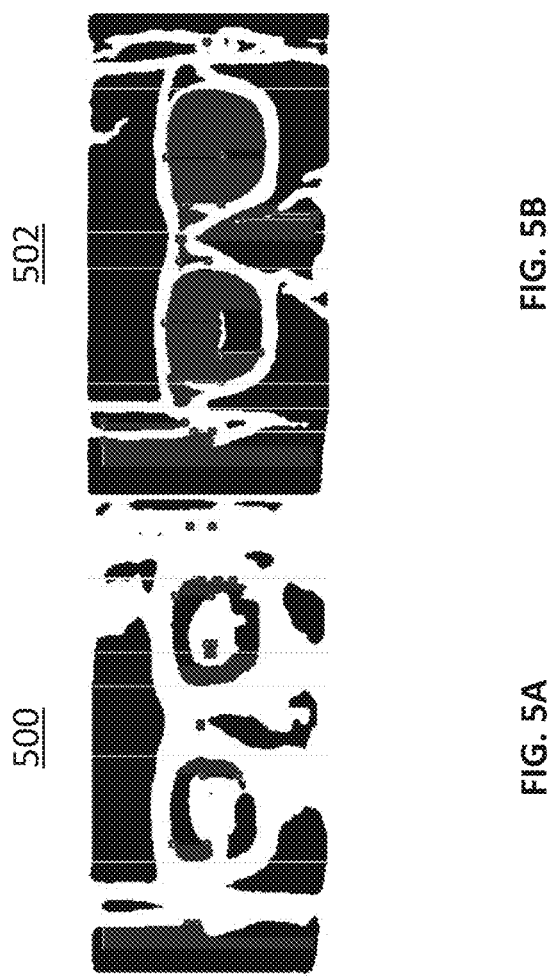
FIGS. 5A and 5B are illustrative diagrams of results of an edge finding algorithm performed to the edge detection representation described above with respect to FIG. 4, in accordance with various embodiments.

FIGS. 5A and 5B are illustrative diagrams of results of an edge finding algorithm performed to edge detection representation 400 of FIG. 4. In some embodiments, image 500 of FIG. 5A may represent the edge finding algorithm used against a highest black/white thresholding of edge detection representation 400, while image 502 of FIG. 5B illustrates results of the edge finding algorithm used against a lowest black/white thresholding of edge detection representation 400. In the illustrative embodiments of FIGS. 5A and 5B, single pixel vertical lines in images 500 and 502 may represent a horizontal position of edges found during each iteration of the edge finding algorithm.

Figure 6:
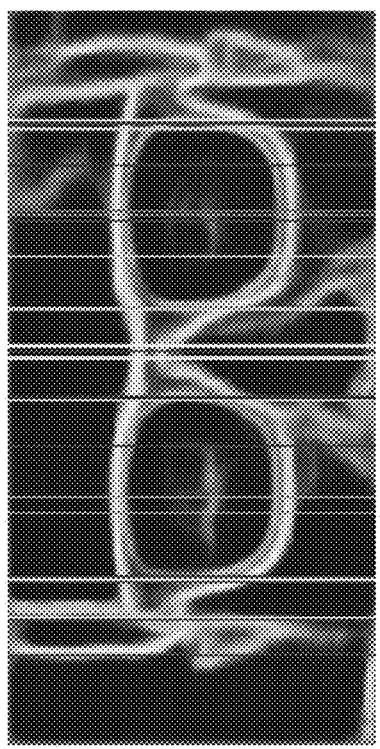
FIG. 6 is an illustrative diagram of candidate edges after running an edge detection algorithm across parameter ranges, in accordance with various embodiments.

FIG. 6 is an illustrative representation 600 of all candidate edges after running an edge detection algorithm across all parameter ranges (e.g., black/white thresholding). In some embodiments, the edges that are found by the edge detection algorithm include candidate edges for (i) a left edge of a left side of the glasses frame, (ii) a right edge of the left side of the glasses frame, (iii) a left edge of a right side of the glasses frame, and (iv) a right edge of the right side of the glasses frame. In some embodiments, the grouping of the candidate edges for (i)-(iv) may be determined based on a horizontal position of each edge relative to a center of each previously computed eye rectangle, e.g., left eye rectangle 104L and right eye rectangle 104R, along with a horizontal center between the left and right eye rectangles. The candidate set of edges for each extent of the glasses inner frame edges may be used to find the four edges that best match the physical dimensions of the eyewear frames being worn.

Figure 7:
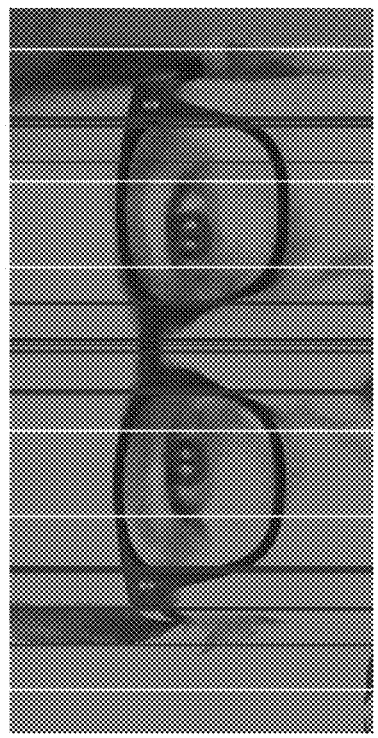
FIG. 7 is an illustrative diagram of a candidate set of edges for eyewear extents, in accordance with various embodiments.

FIG. 7 is an illustrative diagram of a candidate set of edges for eyewear extents, in accordance with various embodiments. In some embodiments, another heuristic optimization—filtering out any edges that are considered too close to a horizontal location of the pupils—may be used. For instance, there may tend to be many invalid edges found due to the presence of the person's actual eyes, which may be ignored. Thus, in some embodiments, it may be assumed that the pupils are located at a center of the previously computed eye rectangles, e.g., eye rectangles 104L and 104R, and a configurable variable referred to as a "pupil filter width," e.g., 'pupil_filter_width' delta, surrounds the pupils. In some embodiments, a current value of this configurable variable may be determined based on a large number of images of different centers of eye rectangles. For instance, a standard deviation of a pupil for a plurality of different pupils may be computed and used as the configurable variable. In some embodiments, the pupil_filter_width delta may have a value of 0.04, 0.05, 0.06, 0.07, or 0.08, or any range between any pair thereof. As an example, in image 700 of FIG. 7, the gray lines may represent locations of candidate edges, and the white lines may represent acceptable ranges for the configurable variable about the candidate edges. In some embodiments, additional configurable variable for the calculations may also be determined through processing of many images to find effective values, as mentioned above.

In some embodiments, the computer vision system may be configured to iterate all possible permutations of the edges to find a best fit to the known dimensions of the glasses being worn. For instance, a permutation of edges with a closest match to the ratios of distances between the edges may be determined. In some embodiments, while considering each permutation of edges, a custom Yaw deskewing algorithm may be applied to the edge positions. To apply the custom Yaw deskewing algorithm, a computation of how much a wearer's head must be rotated in order for the glasses to match the known glasses edge ratios may be performed. As a result of applying the deskewing, many permutations that, at first, appeared to match the glasses edge ratios, can now be discarded as being inadequate.

Figure 8:
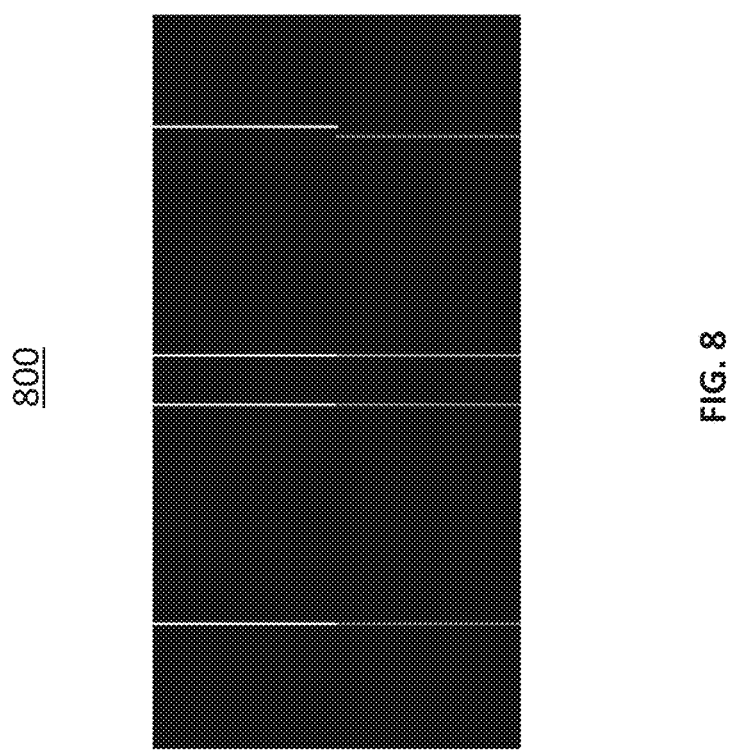
FIG. 8 is an illustrative diagram of an image of a single permutation of four candidate edges, in accordance with various embodiments.
Figure 9:
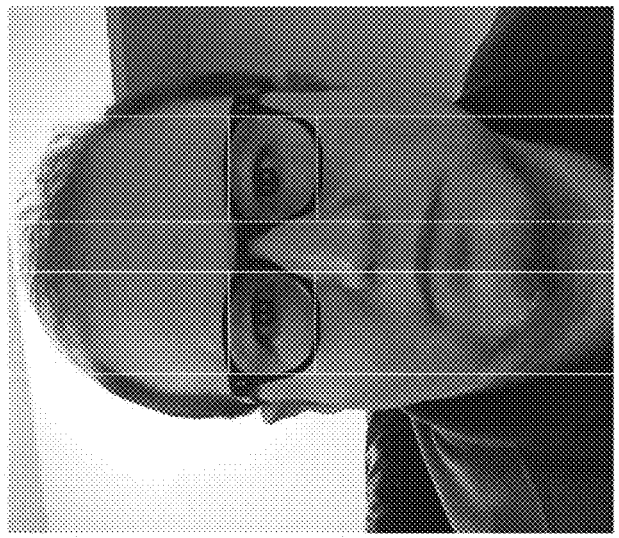
FIG. 9 is an illustrative diagram of an image depicting a combined best guesses for both horizontal edges and vertical edges, based on known frame dimensions, in accordance with various embodiments.

FIG. 8 is an illustrative diagram of an image 800 of a single permutation of four candidate edges, in accordance with various embodiments. In image 800 of FIG. 8, the deskewing is displayed as the adjustment of the rightmost top bright white edge to the gray edge just below it. At this point, a best guess as to the locations of the horizontal positions of the left and right edges of the glasses may be determined. To determine the top and bottom edges of the glasses, a similar methodology may be employed with the exception that the vertical direction around the eye may be used as opposed to the horizontal direction. The combined best guesses for both the horizontal edges and the vertical edges, based on the known frame dimensions, is depicted by image 900 of FIG. 9.

In some embodiments, a process for finding pupil locations may be described. The process may include:

(1) Reduce a search area for the pupils to be a vertically reduced subsection of the previously computed eye rectangles.

(2) Convert the image from RGB to HSV.

(3) Iterate over a range of clipping values for which the V in HSV of the image is clipped based on its mean and standard deviation.

(4) Create a grayscale RGB image from just the V channel of the clipped HSV image.

(5) For each iteration of a V image, generate a candidate pupil location using the following sub-steps:

(5a) Adjust image contrast.

(5b) Apply an OpenCV medianBlur kernel to the image.

(5c) Apply an OpenCV GaussianBlur kernel to the image.

(5d) Apply a OpenCV Sobel filter to the image.

(5e) Adjust the Gamma of the image using a custom adaptive iterative application of the OpenCV LUT function.

(5f) Apply thresholding to the image using a custom adaptive iterative application of the OpenCV THRESH_BINARY function.

(5g) Apply skeletonizing to the image using a custom iterative application of the following set of OpenCV functions: MORPH_CROSS, MORPH_ERODE, and MORPH_DILATE.

(5h) Generate a set of circles using the skeletonized image by applying the Hough Circle finding algorithm.

(5i) Determine a single representative pupil location for this iteration of V thresholding by applying a K-means clustering algorithm to the set of circles.

(6) Determine a final best guess pupil location by applying a K-means clustering algorithm to the set of candidate pupil locations.

In some embodiments, the aforementioned process, e.g., steps 1-6, may be performed by a remote computer vision system, a computer vision system implemented on a client device, or a combination of both the remote computer vision system and the computer vision system implemented on the client device.

Figure 10:
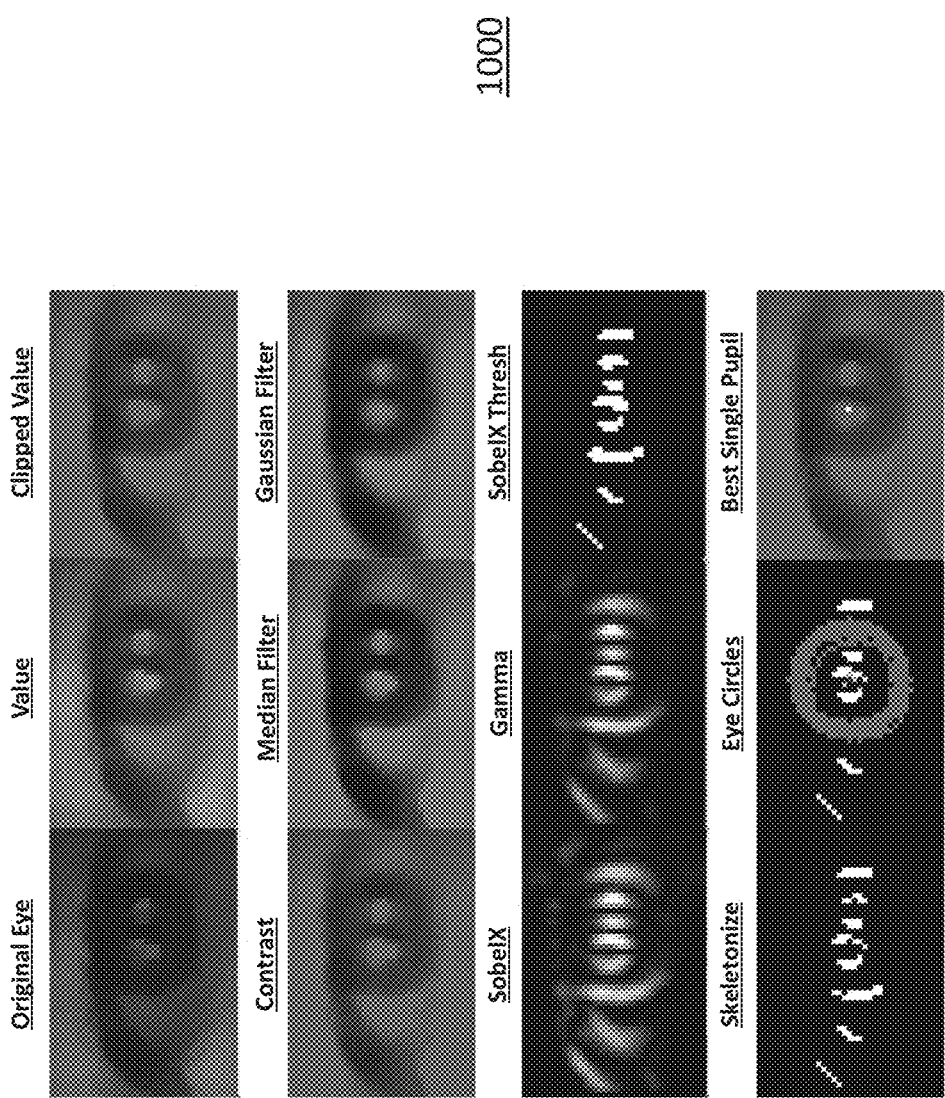
FIG. 10 is an illustrative diagram of a set of images corresponding to various portions of the pupil location algorithm, in accordance with various embodiments.
Figure 11:
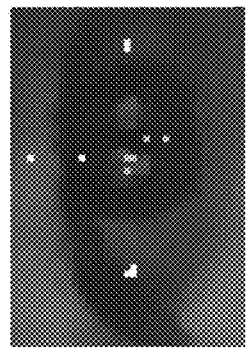
FIG. 11 is an illustrative diagram of image corresponding to a final set of candidate pupils as described in a pupil location finding process, in accordance with various embodiments.
Figure 12:
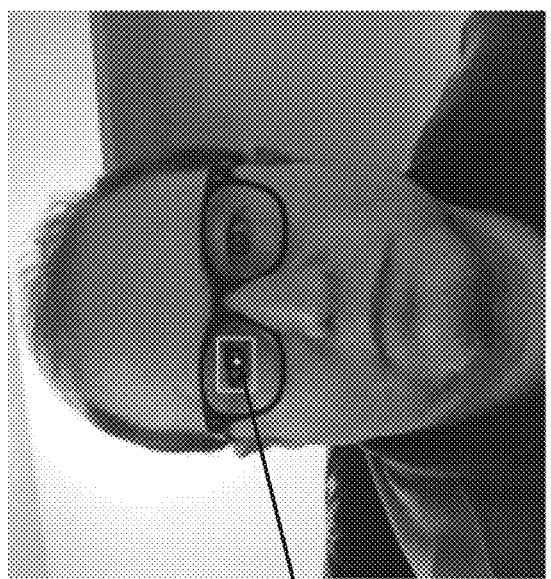
FIG. 12 is an illustrative diagram of image corresponding to a final pupil best guess after clustering of candidate pupils, in accordance with various embodiments.

In FIG. 10, a set of images 1000 corresponding to various portions of the pupil location algorithm are shown, in accordance with various embodiments. For example, the top left image (e.g., row 1, column 1) may correspond to an original eye image, the top middle image (e.g., row 1, column 2) may correspond to the V channel image, the top right image (e.g., row 1, column 3) may correspond to the clipped V channel image, at the images in rows 2-4, columns 1-3, may correspond to steps 5a-5i, respectively, from left to right, top to bottom. FIG. 11, for example, depicts an image 1100 corresponding to a final set of candidate pupils as described at step 6 above. FIG. 12, for example, depicts an image 1200 corresponding to a final pupil best guess 1202 after clustering of the candidate pupils.

Figure 13:
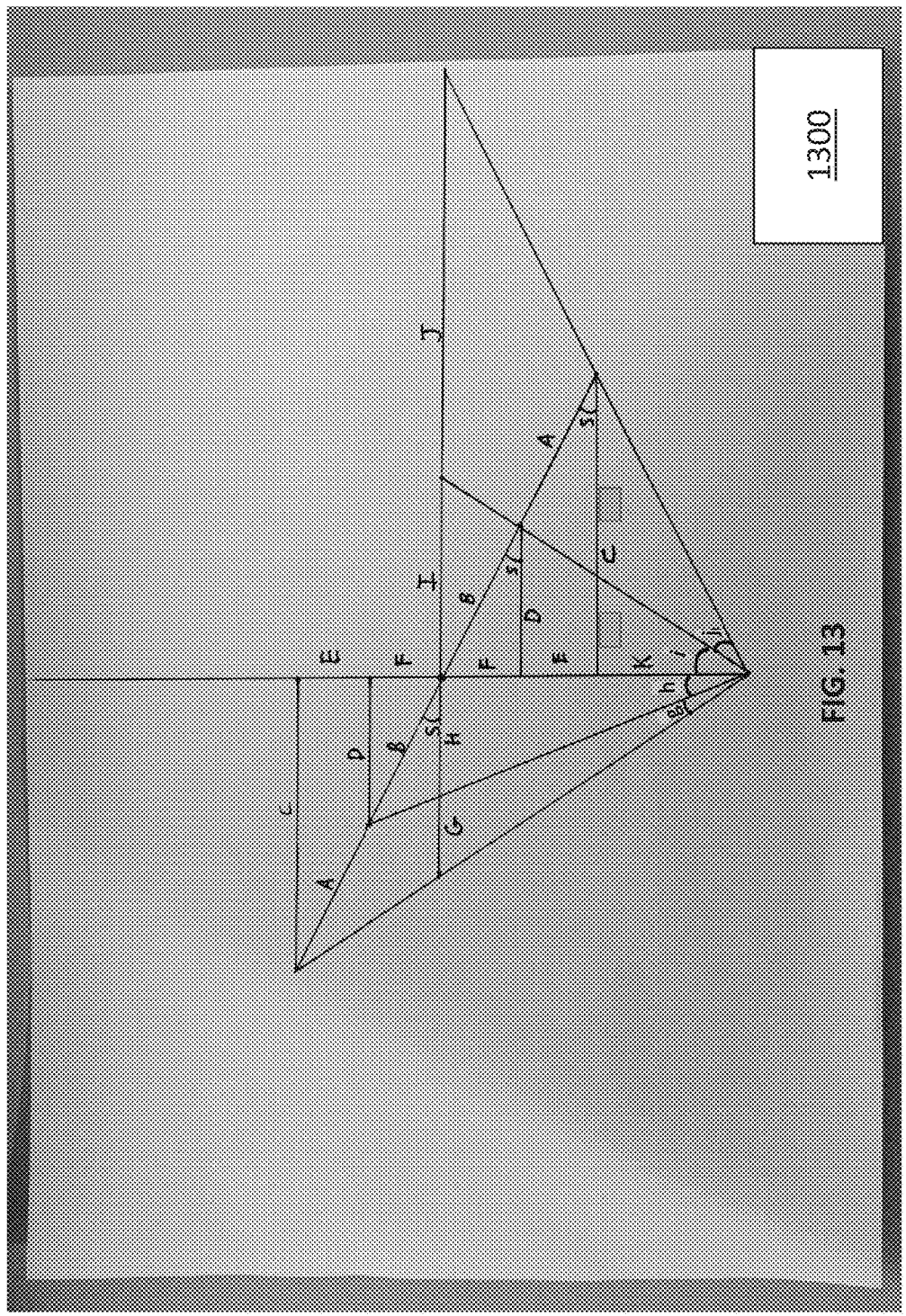
FIG. 13 is an illustrative diagram of an abstract overhead view of a camera at a bottom vertex taking a picture of a person wearing glasses, in accordance with various embodiments.

In some embodiments, a process for performing Yaw deskewing may be described. FIG. 13 is an illustrative diagram of an abstract overhead view 1300 of a camera at a bottom vertex taking a picture of a person wearing glasses, where a center of the bridge of the glasses lies at the center dot in the diagram, and the glasses are represented by the line ABBA. Using known values in a physical space, the following conventions may be used:

A=lens width;
B=½ bridge width; and
K=distance from the camera to a closest point on the glasses.

For K, a reasonable estimate for this value may be used. In practice, any inaccuracy may typically have a negligible effect on the resulting computations due to the difference in scale between K and all the other lengths in the diagram.

The target values in pixel space, as only rations of these in physical space may be known, may correspond to:

G=left lens width in pixels;
H+I=bridge width in pixels; and
J=right lens width in pixels.

In some embodiments, a useful intermediate ratio that is valid in both the physical space and the pixel space may correspond to:

Z=G/J=a ratio of left lens width to right lens width in pixels.

In some embodiments, the Yaw, which may correspond to the variable "s" in FIG. 13, of a user's head, may be computed. After the Yaw is computed, the target values (G, H, I, and J) may be computed in pixel space. Subsequently, these values may be used to deskew the left lens, right lens, and the bridge of the permutations of the glasses extents as iterated in the Glasses Extent Algorithm described previously.

In some embodiments, to solve for the Yaw, e.g., "s," the following steps may be performed:

First, the following quadratic may be solved for its practical root:

$Z=(KK+AK \sin(s))/((K+(2A+2B)\sin(s))*(K+(A+2B)\sin(s)))$;

$s=a \sin((-(2AAZ+6ABZ+4BBZ)+\mathrm{sqrt}((3AKZ+4BKZ-AK)^2-4(2AAZ+6ABZ+4BBZ)(Z-1)KK))/2(2AAZ+6ABZ+4BBZ))$.

Given s, G, H, I, and J may be computed using:

$F=B \sin(s)$ $E=A \sin(s)$ $D=B \cos(s)$ $C=(A+B)\cos(s)$ $\tan(g+h)=C/(K+2F+2E))$ $\tan(h)=D/(K+2F+E)$ $\tan(i)=D/(K+E)$ $\tan(i+j)=C/K$ $G=\tan(g+h)*(K+E+F)-\tan(h)*(K+E+F)$ $H=\tan(h)*(K+E+F)$ $I=\tan(i)*(K+E+F)$ $J=\tan(i+j)*(K+E+F)-\tan(i)*(K+E+F)$ Based on the aforementioned computations, the target values may be deskewed using the following formulas:

$$\text{deskewed\_left\_lens\_width}=\text{left\_lens\_width}*\text{glasses\_lens\_width}/G \quad 1$$

$$\text{deskewed\_right\_lens\_width}=\text{right\_lens\_width}*\text{glasses\_lens\_width}/J \quad 2$$

$$\text{deskewed\_bridge\_width}=\text{bridge\_width}*\text{glasses\_bridge\_width}/(H+I) \quad 3$$

In formulas 1-3,
left_lens_width=width in pixels of the skewed left lens;
right_lens_width=width in pixels of the skewed right lens;
bridge_width=width in pixels of the skewed bridge;
glasses_lens_width=width of one of the lenses of the physical glasses in millimeters; and
glasses_bridge_width=width of the bridge of the physical glasses in millimeters.

Figure 14:
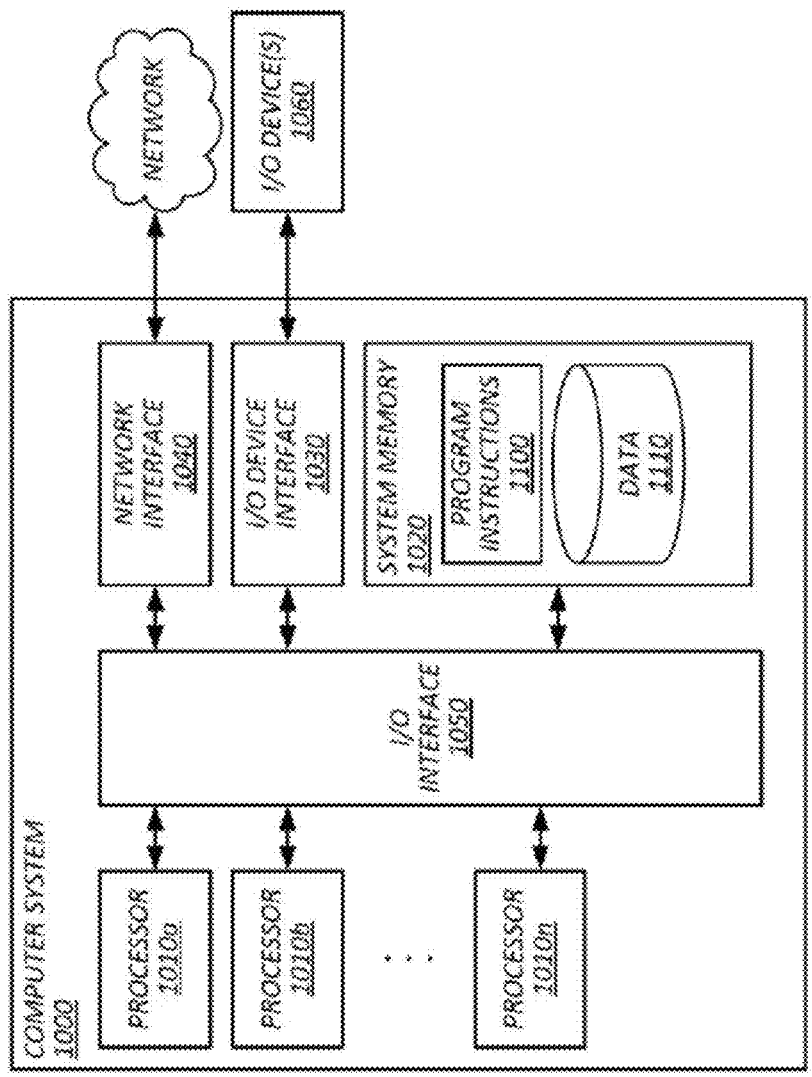
FIG. 14 is an illustrative diagram of an exemplary computing system 1000 in accordance with embodiments of the present technique.

FIG. 14 is an illustrative diagram of an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. a memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In some embodiments, a GUI/Widget interface is described that may allow individuals to upload images of themselves to a computer vision system, e.g., computer system 1000 of FIG. 14, for generating specifications for creating customized eyewear for an individual. In some embodiments, a user may capture an image of themselves via their user device. The user may then, automatically or in response to a specific action, send the image to computer system 1000 for performing one or more of the processes described above with respect to FIGS. 1-13. For example, a user may capture a photo (e.g., a "selfie") of themselves. The photo may be taken at arm's length, eye level, and straight on. In some embodiments, the photo may be captured while the user is wearing the glasses that the lenses will be crafted for using the specifications of computer system 1000. For instance, this may correspond to a final step in a home, try-on process. Techniques for using user-provided images to generate and provide customized eyewear is described in detail in commonly-assigned U.S. Pat. No. 9,086,582, entitled "SYSTEM AND METHOD FO PROVIDING CUSTOM-FITTED AND STYLED EYEWEAR BASED ON USER-PROVIDED IMAGES AND PREFERENCES," which was filed on Aug. 20, 2014, and which issued on Jul. 21, 2015, the disclosure of which is incorporated herein by reference in its entirety.

The dimensions of frames, e.g., a bridge width, a lens width, may be input into an interface of the user device or may be preloaded into computer system 1000. For example, an application instance executing on the user device may, prior or subsequent to capturing the image of the user, may allow the user to input specific information related to the glasses worn by the user into computer system 1000 via the GUI. As another example, the individual may log-in to an account associated with the computer vision system, e.g., computer system 1000, and the information related to that user's glasses may automatically be retrieved from a client database. In some embodiment, an administrator, such as an optician, may open the widget and straighten the photo by zooming in and aligning a top frame edge with one of the horizontal lines. Next, the pupil detection algorithms and frame edge extent algorithms may be used.

In some embodiments, the result of the analysis yields the pupil placements and rectangles at the top, bottom, and sides of each lens/frame edge. The administrator may use the GUI to make any corrections to the placements. The human administrator may save x minutes average on each image with this "human assist" algorithm. The algorithm uses the data collected by the human administrator's corrections to improve the accuracy of the placements on future images. In some embodiments, the mono pupil distance, segment height, bifocal height, and ocular center height dimensions are output. These steps may take less than 2 minutes per image, and the data may be combined with the individual's eyewear prescription in order to make lenses. In particular, it has been found that a remake rate (e.g., rate of individuals that require their lenses to be remade due to errors) is approximately 2%, which mostly is due to changes to a customer personal preference.

Figure 15:
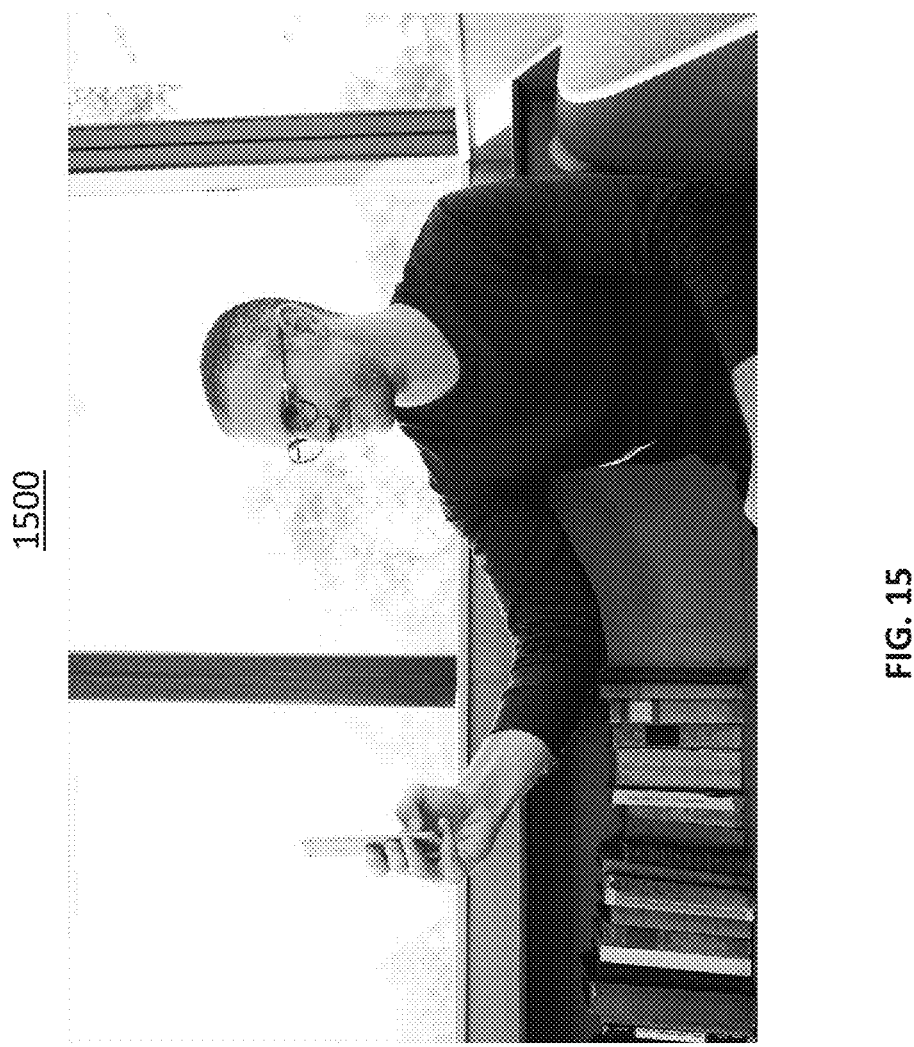
FIG. 15 is an illustrative diagram of an image of a user taking a photograph of themselves using a user device while wearing a desired glasses frame, in accordance with various embodiments.

FIG. 15 is an illustrative diagram of an image 1500 a user taking a "selfie," i.e., a photograph of themselves using a user device, while wearing the desired glasses frames.

In some embodiments, a user interface may be provided for inputting information about the user's eyewear requirements, as well as personal information about the user. This information may be entered by the user, or saved via a user account. An example of a user interface for inputting information about a user's eyewear requirements is described by FIG. 16 of U.S. Provisional Patent Application No. 62/872,042, titled "SYSTEM AND METHOD FOR EYEWEAR SIZING," filed on Jul. 9, 2019, which is incorporated herein in its entirety.

In some embodiments, a user interface may be provided including a captured image of an individual wearing their glasses and the image being adjusted to orient the glasses along a horizontal access. In some embodiments, this step may be performed by an administrator, such as an optician, as detailed above. An example of a user interface including a captured image of an individual wearing their glasses and adjustments to the image to orient the glasses along a horizontal access is described by FIG. 17 of U.S. Provisional Patent Application No. 62/872,042, titled "SYSTEM AND METHOD FOR EYEWEAR SIZING," filed on Jul. 9, 2019, which is incorporated herein in its entirety.

In some embodiments, the user interface may depict an image being adjusted to center and orient the user captured image. For example, FIG. 18 of U.S. Provisional Patent Application No. 62/872,042, titled "SYSTEM AND METHOD FOR EYEWEAR SIZING," filed on Jul. 9, 2019, which is incorporated herein in its entirety, illustrates the image being rotated by −1.03 degrees.

In some embodiments, the user interface may depict an image being adjusted and oriented. For example, FIG. 19 of U.S. Provisional Patent Application No. 62/872,042, titled "SYSTEM AND METHOD FOR EYEWEAR SIZING," filed on Jul. 9, 2019, which is incorporated herein in its entirety, illustrates the image being rotated by 2.17 degrees.

In some embodiments, the user interface may display output results for various parameters associated with determining pupil location and edge extent, as described with reference to FIGS. 1-13. For example, FIG. 20 of U.S. Provisional Patent Application No. 62/872,042, titled "SYSTEM AND METHOD FOR EYEWEAR SIZING," filed on Jul. 9, 2019, which is incorporated herein in its entirety, is an illustrative diagram of a user interface including output results for various parameters associated with determining pupil location and edge extent for the input image of FIG. 19 of U.S. Provisional Patent Application No. 62/872,042.

In some embodiments, the user interface may display output results of various parameters associated with determining pupil location and edge extent, as described above with reference to FIGS. 1-13. For example, FIGS. 21 and 22 of U.S. Provisional Patent Application No. 62/872,042, titled "SYSTEM AND METHOD FOR EYEWEAR SIZING," filed on Jul. 9, 2019, which is incorporated herein in its entirety, are illustrative diagrams of user interfaces including output results for various parameters associated with determining pupil location and edge extent.

In some embodiments, the user interface may include additional functionality available to individuals using the GUI/Widget described above. In some embodiments, users may be able to include information regarding progressive lens overlay and lens material thickness into the GUI/Widget. For example, FIG. 23 of U.S. Provisional Patent Application No. 62/872,042, titled "SYSTEM AND METHOD FOR EYEWEAR SIZING," filed on Jul. 9, 2019, which is incorporated herein in its entirety, depicts a user interface including additional functionality available to individuals using the GUI/Widget described above.

In some embodiments, machine learning models may be implemented to control algorithm configuration parameters rather than using manually established static values.

In some embodiments, machine learning models may be implemented for frame edge detection and pupil detection based on the user provided ground truth data gathered from the GUI widget.

In some embodiments, multiple images with the user focusing at different distances may be utilized to compute individualized convergence parameters based on the movement of the pupils, for high accuracy lens specification.

In some embodiments, multiple images or video may be utilized to establish 3D representations of the scene to compute Pantoscopic tilt, for high accuracy lens specification.

In some embodiments, a profile image may be utilized where a 3D representation may not need to be established, but rather utilize the existing edge pipeline to determine a Pantoscopic tilt.

In some embodiments, multiple images or video may be utilized to establish 3D representations of a scene to compute vertex distance from the back surface of the lens to the cornea, for high accuracy lens specification.

In some embodiments, a profile image may be utilized where a 3D representation may not need to be established, but rather utilize the existing edge pipeline to determine vertex distance.

In some embodiments, adjustments, made by administrators in the GUI, may be logged to the algorithmically generated results for frame edges and pupil locations, and utilizing that data to improve the existing algorithmic pipelines.

In some embodiments, the Yaw deskewing algorithm may be generalized to compensate for cases where a user's face is not centered in the image.

In some embodiments, accuracy requirements may be adjusted based on lens material type. This can be correlated with a confidence level computation in both machine learning (ML) and non-ML algorithms.

In some embodiments, single vision blank size calculation may be performed to recommend minimum lens blank size based upon PD, OC, and frame/lens sizing.

In some embodiments, the above techniques may be used to configure (e.g., customize or select among a set of pre-set configurations) augmented reality or virtual reality headsets (or other head-mounted displays). Some embodiments may be used to determine the position of the eye box in such displays based on the dimensions discussed above, like IPD and OC height. For example, some embodiments may be used to preset electronic IPD adjustments or determine mechanical IPD adjustments to the eye box, for instance, by determining a lateral position of a display in a set of frames. Similarly, some embodiments may be used to determine an amount of eye relieve and adjust a focal depth for optics in such displays, and some embodiments may be used to vertically position a diffractive waveguide grating, a reflective waveguide grating, or a silvered mirror in the frames to align with the OC height.

Some embodiments may configure automatic lens corrections based on the data gathered above, e.g., optical parameters of an alvarez lens or deformable lens may be selected, such lenses may be positioned, or such lenses may be adjusted based on pupil position and eye relief determined with the techniques described above. In some cases, a fixed lens insert (e.g., a snap-in insert held in place by a resilient member or a magnet) or trial frame may be configured with the techniques described above to determine the lens shape so as to align the lens with the pupil and have the correct focal length.

Some embodiments may implement the above techniques in a computing environment 1600 shown in FIG. 16. Embodiments may include a user computing device 1602, like a smart phone with a camera or a desktop computer with an image file stored thereon, in communication with a server 1604 executing the above-described processes responsive to images obtained via a network 1606, e.g., the Internet, from the user computing device 1602. The user computing device may execute a browser (rendering a webpage from server 1604) or a native application by which images are uploaded to server 1604.

In some cases, the user computing device may supply 3D images, or data by which 3D images may be formed, the server 1604. Examples include depth images formed with structured light, Lidar, time-of-flight sensors, or the like. In some cases, depth maps may be obtained from one or more cameras, like one and only one camera, on a hand-held mobile user computing device, like with the ARCore Depth API available for Android™. In some cases, a depth channel may in such images may be processed with techniques like those discussed above to generate outputs like those discussed above. For instance, a depth channel may serve as the value by which pixel intensity is assigned in a greyscale image. In some cases, the image may be in the form of a 3D map of a space formed from a plurality of input images from a camera of the user-device while at different poses.

Some embodiments may execute a process 1700 like that shown in FIG. 17, e.g., with the server 1604. Some embodiments perform obtaining, with the computing system, an image depicting a human face including eyewear, as shown in block 1702. Some embodiments perform converting the image to a grayscale image, as shown in block 1704. Some embodiments perform detecting a face rectangle using one or more facial detection classifiers, as shown in block 1706. Some embodiments perform determining, based on the face rectangle, using one or more facial detection classifiers, a first eye rectangle of a left eye of the human face and a second eye rectangle of a right eye of the human face, as shown in block 1708. Some embodiments perform detecting, based on the first eye rectangle and the second eye rectangle, an inner edge and an outer edge of the eyewear on a left side of the human face and on a right side of the human face, and an upper edge and a lower edge of the eyewear on the left side of the human face and on the right side of the human face, as shown in block 1710. Some embodiments perform determining a first location of a first pupil of the left eye and a second location of a second pupil of the right eye based on the inner edge and the outer edge of the eyewear on the left side and on the right side, and the upper edge and the lower edge of the eyewear on the left side and the right side, as shown in block 1712. Some embodiments perform generating specifications including locations of extents for the eyewear based on (i) the inner edge and the outer edge of the eyewear on the left side and on the right side, (ii) the upper edge and the lower edge of the eyewear on the left side and the right side, and (iii) the first location of the first pupil and the second location of the second pupil, as shown in block 1714.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. as used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method, comprising: obtaining, with a computer system, obtaining, with the computing system, an image depicting a human face including eyewear; converting the image to a grayscale image; detecting a face rectangle using one or more facial detection classifiers; determining, based on the face rectangle, using one or more facial detection classifiers, a first eye rectangle of a left eye of the human face and a second eye rectangle of a right eye of the human face; detecting, based on the first eye rectangle and the second eye rectangle, an inner edge and an outer edge of the eyewear on a left side of the human face and on a right side of the human face, and an upper edge and a lower edge of the eyewear on the left side of the human face and on the right side of the human face; determining a first location of a first pupil of the left eye and a second location of a second pupil of the right eye based on the inner edge and the outer edge of the eyewear on the left side and on the right side, and the upper edge and the lower edge of the eyewear on the left side and the right side; generating specifications including locations of extents for the eyewear based on (i) the inner edge and the outer edge of the eyewear on the left side and on the right side, (ii) the upper edge and the lower edge of the eyewear on the left side and the right side, and (iii) the first location of the first pupil and the second location of the second pupil.

2. A non-transitory computer-readable medium storing computer program instructions that, when executed by one or more processors, effectuate operations comprising: the operations of embodiment 1.

3. A system, comprising: one or more processors; and memory storing instructions that when executed by the processors cause the processors to effectuate operations comprising: the operations of embodiment 1.

What is claimed is:

1. A non-transitory computer-readable medium comprising computer program instructions that, when executing by a computing system, effectuate operations comprising:
    obtaining, with the computing system, an image depicting a human face including eyewear;
    determining, with the computing system, a face region using one or more facial detection classifiers;
    determining, with the computing system, based on the face region, using one or more facial detection classifiers, a first eye region of a left eye of the human face and a second eye region of a right eye of the human face;
    determining, with the computing system, based on the first eye region and the second eye region, an inner edge and an outer edge of the eyewear on a left side of the human face and on a right side of the human face, and an upper edge and a lower edge of the eyewear on the left side of the human face and on the right side of the human face;
    determining, with the computing system, a first location of a first pupil of the left eye and a second location of a second pupil of the right eye based on the inner edge and the outer edge of the eyewear on the left side and on the right side, and the upper edge and the lower edge of the eyewear on the left side and the right side; and
    generating, with the computing system, specifications including locations of extents for the eyewear based on (i) the inner edge and the outer edge of the eyewear on the left side and on the right side, (ii) the upper edge and the lower edge of the eyewear on the left side and the right side, and (iii) the first location of the first pupil and the second location of the second pupil.

2. The medium of claim 1, the operations comprising: converting the image to a grayscale image before detecting the face region.

3. The medium of claim 1, wherein:
    the image is obtained from an application executing on a user computing device remote from a server system that executes the operations; and
    the image or a transformed version of the image is reduced in vertical area after determining the face region and before determining the first location and the second location.

4. The medium of claim 1, wherein:
    at least some of the operations are performed by means for client-side computer vision.

5. The medium of claim 1, wherein:
the one or more facial detection classifiers comprise a cascade of classifiers.

6. The medium of claim 1, wherein the operations comprise:
determining that the first eye region is at greater than a threshold height on in the face region.

7. The medium of claim 1, wherein the operations comprise:
determining that the first eye region is further than a threshold distance from the second eye region.

8. The medium of claim 1, wherein the operations comprise:
determining that the first eye region has greater than a threshold than a threshold amount of vertical overlap with the second eye region.

9. The medium of claim 1, wherein generating specifications comprises:
determining a pupillary distance.

10. The medium of claim 1, wherein generating specifications comprises:
determining a SEG (segment height) value.

11. The medium of claim 1, wherein determining the inner edge and the outer edge of the eyewear on a left side of the human face and on the right side of the human face comprises:
convolving a transformed version of the image with a kernel configured to detect edges.

12. The medium of claim 1, wherein:
at least one of the determining steps is performed with means for machine learning.

13. The medium of claim 1, wherein:
at least one of the determining steps is performed with means for running a neural network architecture on a mobile computing device.

14. The medium of claim 1, wherein:
the computing system comprises a server and a mobile computing device; and
the operations comprise steps for performing a depthwise separable convolution on the image or a transformed version of the image.

15. The medium of claim 1, wherein:
the operations comprise steps for finding pupil locations.

16. The medium of claim 1, wherein determining the first location and the second location comprises at least one of the following:
applying a medianBlur kernel to a transformed version of the image;
applying a GaussianBlur kernel to the transformed version of the image; or
applying a Sobel filter to the transformed version of the image.

17. The medium of claim 1, wherein determining the first location and the second location comprises each of the following:
applying a medianBlur kernel to a transformed version of the image;
applying a GaussianBlur kernel to the transformed version of the image; and
applying a Sobel filter to the transformed version of the image, wherein the first pupil location is a region of the left eye in the image or a transformed version of the image and the second pupil location is a region of the right eye in the image or the transformed version of the image.

18. The medium of claim 1, wherein the operations comprise:
steps for vertical edge finding.

19. The medium of claim 1, wherein the operations comprise:
providing eyewear based on the specifications.

20. A method, comprising:
obtaining, with a computing system, an image depicting a human face including eyewear;
determining, with the computing system, a face region using one or more facial detection classifiers;
determining, with the computing system, based on the face rectangle, using one or more facial detection classifiers, a first eye region of a left eye of the human face and a second eye region of a right eye of the human face;
determining, with the computing system, based on the first eye region and the second eye region, an inner edge and an outer edge of the eyewear on a left side of the human face and on a right side of the human face, and an upper edge and a lower edge of the eyewear on the left side of the human face and on the right side of the human face;
determining, with the computing system, a first location of a first pupil of the left eye and a second location of a second pupil of the right eye based on the inner edge and the outer edge of the eyewear on the left side and on the right side, and the upper edge and the lower edge of the eyewear on the left side and the right side; and
generating, with the computing system, specifications including locations of extents for the eyewear based on (i) the inner edge and the outer edge of the eyewear on the left side and on the right side, (ii) the upper edge and the lower edge of the eyewear on the left side and the right side, and (iii) the first location of the first pupil and the second location of the second pupil.

* * * * *